(12) United States Patent
Reeve

(10) Patent No.: US 8,922,653 B1
(45) Date of Patent: Dec. 30, 2014

(54) CRIB MOBILE AND SURVEILLANCE SYSTEM

(76) Inventor: Lawren Reeve, Valley Springs, CA (US)

( * ) Notice: Subject to any disclaimer, the term of this patent is extended or adjusted under 35 U.S.C. 154(b) by 753 days.

(21) Appl. No.: 13/237,692

(22) Filed: Sep. 20, 2011

(51) Int. Cl.
*H04N 7/18* (2006.01)

(52) U.S. Cl.
CPC .................................... *H04N 7/181* (2013.01)
USPC ........................................................ 348/143

(58) Field of Classification Search
None
See application file for complete search history.

(56) References Cited

U.S. PATENT DOCUMENTS

| 6,113,455 A | 9/2000 | Whelan et al. |
| 7,470,167 B2 | 12/2008 | Clark |
| 7,774,032 B2 | 8/2010 | Swan et al. |
| 2003/0153240 A1* | 8/2003 | DeJule ........................... 446/227 |
| 2008/0016624 A1* | 1/2008 | Osborn ............................. 5/658 |
| 2010/0060448 A1* | 3/2010 | Larsen et al. ............ 340/539.15 |

* cited by examiner

*Primary Examiner* — Sath V Perungavoor
*Assistant Examiner* — Kate Luo
(74) *Attorney, Agent, or Firm* — Crossley Patent Law

(57) ABSTRACT

A crib mobile and surveillance system which communicates video data captured by a camera within a mobile member housing, and sounds received by a microphone disposed in a base, to a handheld monitor; the video data displayed and broadcast in real time on a monitor screen on the handheld monitor to remotely monitor a child lain in a crib having the present device. and to operate a plurality of modes, each of which is selectable, activated, and deactivated independently and concurrently at the base of the device and remotely by the handheld monitor.

10 Claims, 4 Drawing Sheets

CRIB MOBILE AND SURVEILLANCE SYSTEM

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of crib mobile and surveillance systems are known in the prior art. However, what is needed is a crib mobile and surveillance system configured to communicate video data, the video data captured by a camera disposed within a mobile member housing, and sounds received by a microphone disposed in a front surface of a base, to a handheld monitor; said video data displayed in real time on a monitor screen disposed on a front side of the handheld monitor, and said sounds broadcast in real time from a second speaker disposed on a back side of the handheld monitor; whereby a caregiver is enabled to remotely monitor a child lain in a crib to which the present device is attached. The present crib mobile and surveillance system is further configured to operate a plurality of modes, including an audio mode; alternately activating selectable preprogrammed audio data, pre-recorded audio data, or extant audio data accessed from an extant MP3 player releasably connected to the device; a motion mode, and a light mode, each of which modes is configured to be selectable, activated, and deactivated independently and concurrently at the base of the device and remotely by means of the handheld monitor in wireless operational communication with the base.

FIELD OF THE INVENTION

The present invention relates to a crib mobile and surveillance system, and more particularly, to a crib mobile and surveillance system configured to communicate video data, the video data captured by a camera disposed within a mobile member housing, and sounds received by a microphone disposed in a front surface of a base, to a handheld monitor; said video data displayed in real time on a monitor screen disposed on a front side of the handheld monitor, and said sounds broadcast in real time from a second speaker disposed on a back side of the handheld monitor; whereby a caregiver is enabled to remotely monitor a child lain in a crib to which the present device is attached. The present crib mobile and surveillance system is further configured to operate a plurality of modes, including an audio mode; alternately activating selectable preprogrammed audio data, pre-recorded audio data, or extant audio data accessed from an extant MP3 player releasably connected to the device; a motion mode, and a light mode, each of which modes is configured to be selectable, activated, and deactivated independently and concurrently at the base of the device and remotely by means of the handheld monitor in wireless operational communication with the base.

SUMMARY OF THE INVENTION

The general purpose of the crib mobile and surveillance system, described subsequently in greater detail, is to provide a crib mobile and surveillance system which has many novel features that result in a crib mobile and surveillance system which is not anticipated, rendered obvious, suggested, or even implied by prior art, either alone or in combination thereof.

Many mobiles attachable to cribs are seen in the prior art. But what is needed is a crib mobile and surveillance system configured to relay video data, the video data captured by a camera disposed within a mobile member housing, and sounds received by a microphone disposed in a front surface of a base, to a handheld monitor; said video data displayed in real time on a monitor screen disposed on a front side of the handheld monitor, and said sounds broadcast in real time from a second speaker disposed on a back side of the handheld monitor; whereby a caregiver is enabled to remotely monitor a child lain in a crib to which the present device is attached. The present crib mobile and surveillance system is further configured to operate a plurality of modes, including an audio mode, a motion mode, and a light mode, each of which modes is configured to be selected, activated, and deactivated independently and concurrently at a base of the device and remotely by means of the handheld monitor in wireless operational communication with the base.

The present crib mobile and surveillance system includes the front surface disposed on the base. A screen is disposed within the front surface. A plurality of buttons, a microphone, and a speaker are also disposed on the front surface. The plurality of buttons are configured to select, activate, and deactivate the plurality of modes; each of the audio, motion, and light modes configured to operate independently and concurrently as desired.

The audio mode is configured to play audio tracks through the speaker. The audio tracks include preprogrammed audio data, pre-recorded audio data, and extant audio data relayed from an extant MP3 player releasably attachable to an MP3 player dock disposed on a second side surface of the base.

The preprogrammed data includes four audio tracks stored within the base. The four audio tracks are envisioned to include lullaby music and natural sounds. The pre-recorded audio data is recorded and stored by the base when a user records sound emitted proximal the microphone using the plurality of buttons disposed on the base. This pre-recorded audio data is stored as an audio track playable up to three minutes in time, and enables a user to record their own voice, a song, or other sounds considered soothing to a child familiar with the user. The extant audio data is selectable from an extant MP3 player releasably inserted into the MP3 player dock disposed on the first side surface of the base. Any audio data stored in the extant MP3 player is thusly playable through the speaker, as may be desired.

The present crib mobile and surveillance system also includes a mobile member. The mobile member includes an arced rod disposed upwardly from a top surface of the base. A housing is rotatably attached to a distal end of the arced rod, the mobile member configured to position the housing over a child lain in an extant crib to which the device is attached. A plurality of support rods are laterally disposed equidistantly around the housing, each of the plurality of support rods disposed in a plane parallel with a bottom face of the housing. Each of a plurality of toys is releasably strung from each of the support rods, and depends therefrom. When the motion mode is activated, the housing rotates, and each of the plurality of toys depending from each of the plurality of support rods circles in motion depending from the housing.

The housing further includes a camera centrally disposed in the bottom face. A motion sensor is also disposed in the bottom face proximal the camera. A plurality of LEDs is disposed in the bottom face around the camera. The plurality of LEDs may be illuminated when the light mode is activated. The camera captures video data when the motion sensor detects motion in the crib, and the video data is wirelessly communicated to the handheld monitor and displayed in real time on a monitor screen disposed on a front side of the handheld monitor. Video data captured by the camera may also be displayed on the monitor screen independent of the motion sensor detecting motion, as may be desired by a caregiver monitoring a child lain in a crib to which the present device is attached.

Sounds emitted proximal the microphone, as may be uttered by a stirring infant, are also wirelessly communicated from the base to the handheld monitor and broadcast through a second speaker disposed on a back side of the handheld monitor. Thusly, a caregiver may be alerted to a waking child, perceive real time video data captured by the camera and displayed upon the monitor screen, and activate each of the plurality of modes by means of a plurality of second buttons disposed on the front side of the handheld monitor before attending to the child, as may be desired.

Thus has been broadly outlined the more important features of the present crib mobile and surveillance system so that the detailed description thereof that follows may be better understood and in order that the present contribution to the art may be better appreciated.

Objects of the present crib mobile and surveillance system, along with various novel features that characterize the invention are particularly pointed out in the claims forming a part of this disclosure. For better understanding of the crib mobile and surveillance system, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
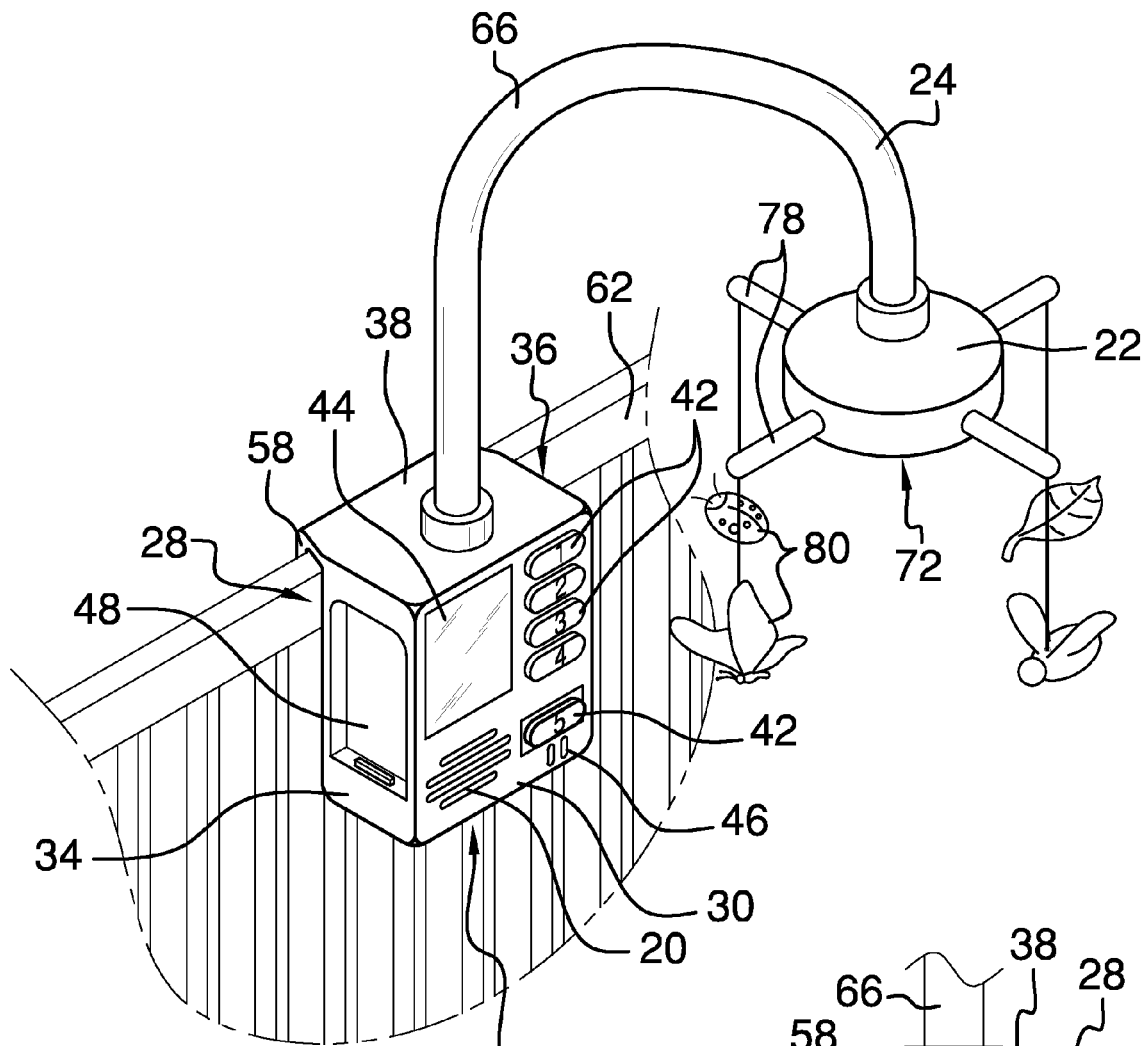
FIG. 1 is an isometric view.
Figure 2:
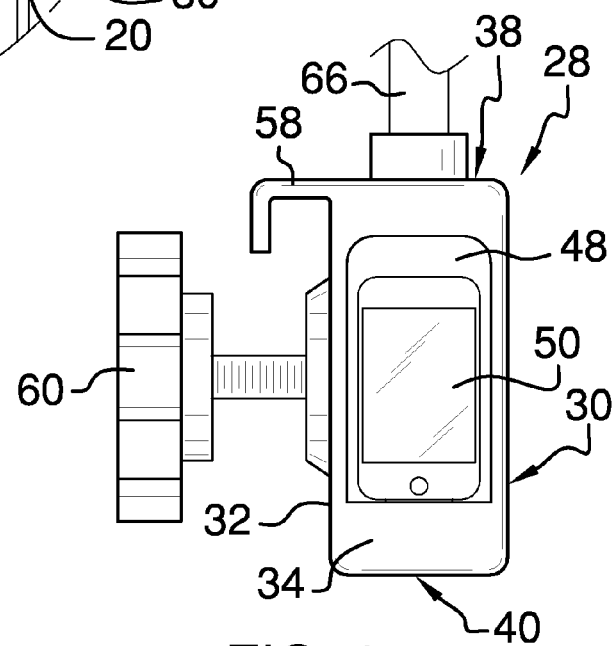
FIG. 2 is a side view of a base.
Figure 3:
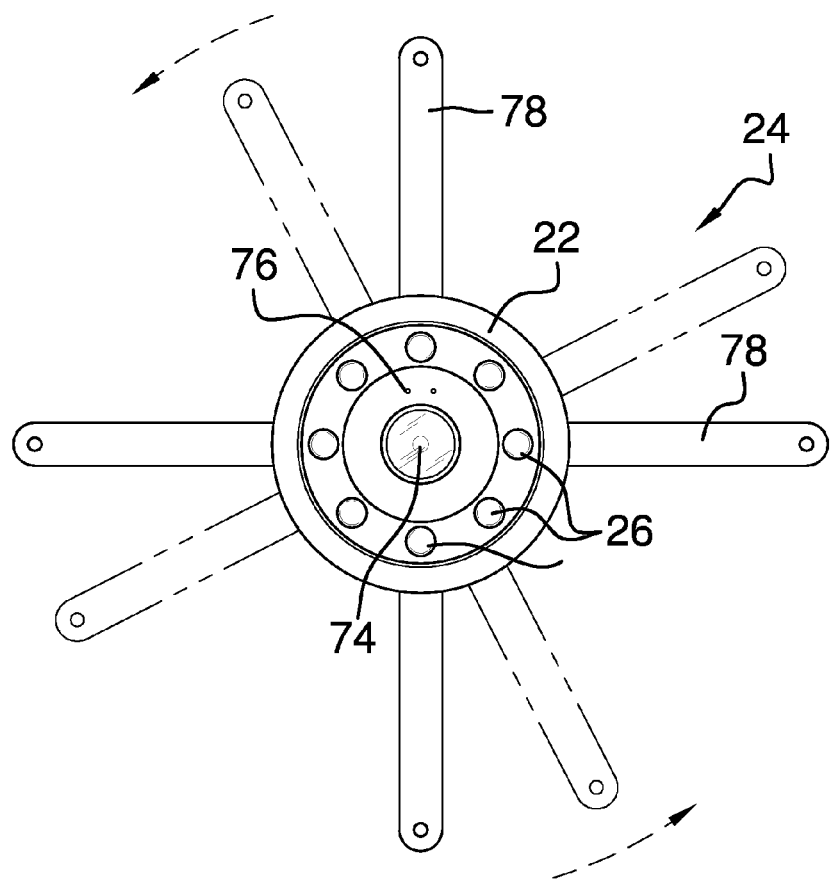
FIG. 3 is a bottom view of a mobile member housing.
Figure 4:
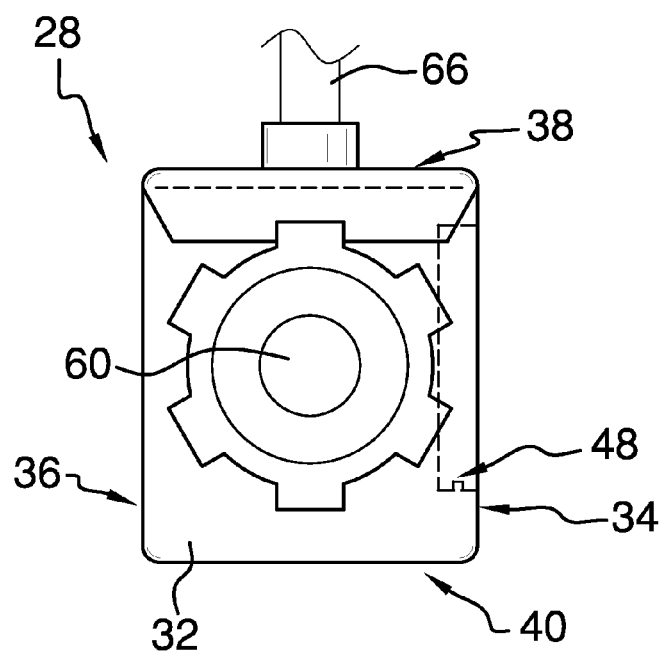
FIG. 4 is a back view of the base.
Figure 5:
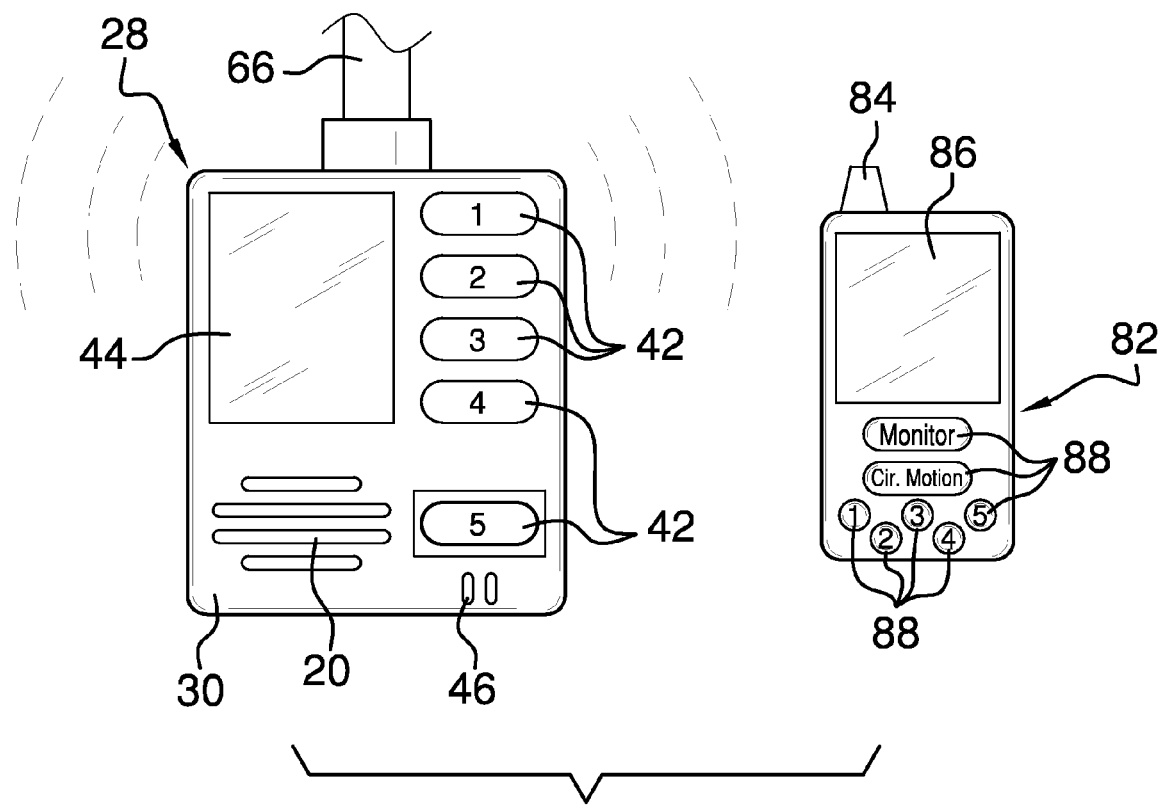
FIG. 5 is a front view of the base and a handheld monitor.
Figure 6:
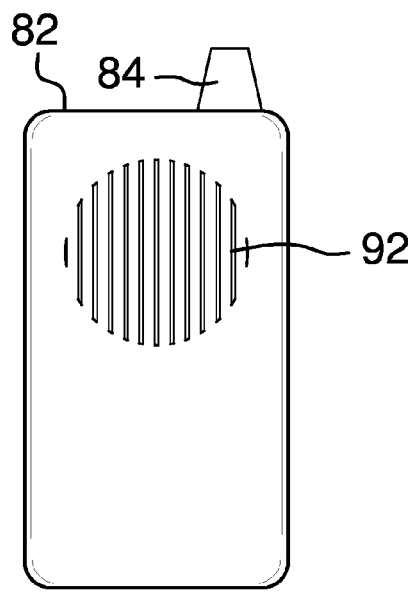
FIG. 6 is a rear view of the handheld monitor.
Figure 7:
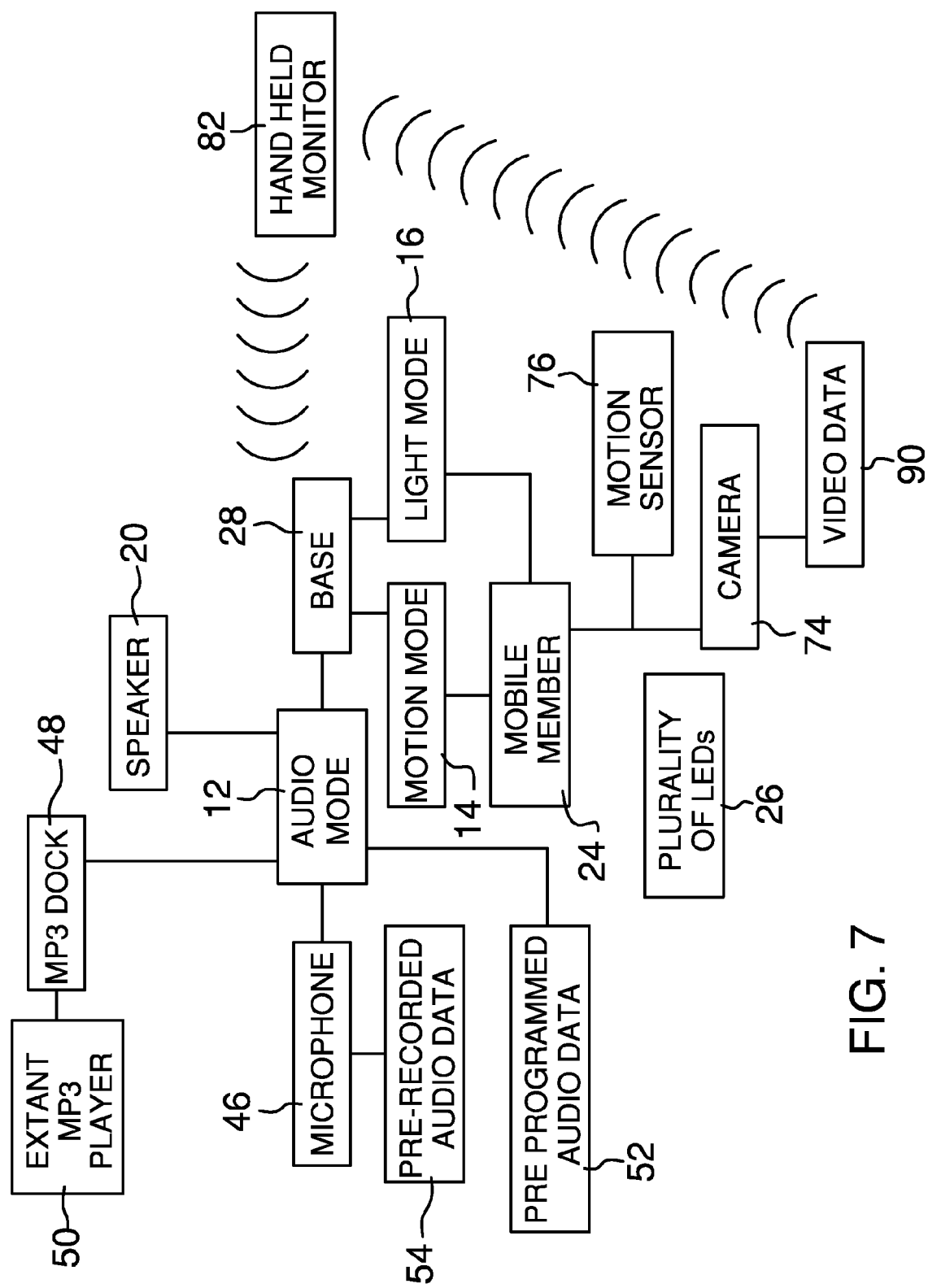
FIG. 7 is a diagrammatic view.

With reference now to the drawings, and in particular FIGS. 1 through 7 thereof, example of the instant crib mobile and surveillance system employing the principles and concepts of the present crib mobile and surveillance system and generally designated by the reference number 10 will be described.

Referring to FIGS. 1 through 7 a preferred embodiment of the present crib mobile and surveillance system 10 is illustrated.

The crib mobile and surveillance system 10 is configured to be selectively operable between a plurality of modes including an audio mode 12, a motion mode 14, and a light mode 16. The audio mode 12 activates selectable audio data (preprogrammed audio data 52, pre-recorded audio data 54, and extant audio data 56), to be played through a speaker 20, the motion mode 14 rotates a housing 22 as part of a mobile member 24, and the light mode 16 activates a plurality of LEDs 26. Each of the plurality of modes is configured to be operable independently and concurrently, as will be detailed subsequently in this specification.

The crib mobile and surveillance system 10 includes a generally cubic base 28. The base 28 includes a front surface 30, a back surface 32, a first side surface 34, a second side surface 36, a top surface 38, and a bottom surface 40. A plurality of buttons 42 is disposed upon the front surface 30, which plurality of buttons 42 are configured to interface with, and select between, the plurality of modes.

The speaker 20 is disposed within the front surface 30. A screen 44 is also disposed within the front surface 30, which screen 44 is configured to display a graphic user interface menu interactive by means of the plurality of buttons 42. A microphone 46 is disposed within the front surface 30, and an MP3 player dock 48 is disposed in the first side surface 34. The MP3 player dock 48 is configured to releasably receive an extant MP3 player 50 flush with the first side surface 34.

When operated in the audio mode 12, audio tracks are relayed to the speaker 20. The audio tracks are selectable and playable between preprogrammed audio data 52, pre-recorded audio data 54, and extant audio data 56 relayed to the speaker 20 from an extant MP3 player 50 releasably positioned within the MP3 player dock 48. In the preferred embodiment depicted herein, the preprogrammed audio data 52 is configured to be four audio tracks comprising natural sounds and lullabies, stored within the base 20. By means of the microphone 46, a user may record up to three minutes of pre-recorded audio data 54 to play as a selectable audio track through the speaker 20. A user may therefore record their own voice, a song, or other soothing words, phrases or sounds accordant with the sensibilities of a child familiar with the user, and subsequently playback the pre-recorded audio data 54 as desired.

An attachment clip 58 is disposed on the back surface 32 proximal to the top surface 38 of the base 28. A screw knob 60 is removably attachable to the back surface 32. The attachment clip 58 is configured to releasably secure the base 28 to an extant crib 62, and the screw knob 60 is inserted into the back surface 32 and tightened until the base 28 is secured to the crib 62. The base 28 may be removed from the crib 62 by unscrewing the screw knob 60 and lifting the base 28 from the crib 62.

The crib mobile and surveillance system 10 also includes the mobile member 24. This mobile member 24 includes an arced pole 66 disposed upwardly from the top surface 38, the arced pole 66 having a distal end 68. The mobile member 24 is configured to present the arced pole 66 distal end 68 over a child lain in the crib 62 when the base 28 is releasably secured to the crib 62.

The housing 22 is rotatably attached to the distal end 68, the housing 22 disposed over the crib 62 interior when the base 28 is attached to the crib 62. The housing 22 includes a bottom face 72 disposed in a plane generally parallel with the top surface 38. A camera 74 is centrally disposed within the bottom face 72. The plurality of LEDs 26 is disposed around the camera 74. A motion sensor 76 is disposed within the bottom face 72 proximal the camera 74. A plurality of support rods 78 is disposed equidistantly around the hosing 22, the support rods 78 disposed in a plane generally parallel with the top surface 38 and the bottom face 72. Each of an attachable plurality of toys 80 is strung from each of the plurality of support rods 78. When the motion mode 14 is activated, the housing 22 is configured to rotate on the distal end 68 and each of the plurality of toys 80 circle depending from each of the plurality of support rods 78.

A handheld monitor 82 is in wireless operational communication with the base 28. The handheld monitor 82 includes a front side 94, a back side 96, an antenna 84, a monitor screen 86 disposed on the front side 94, a plurality of second buttons 88 disposed on the front side 94, and a second speaker 92 disposed in the back side 96. The handheld monitor 82 is configured to activate and deactivate each of the plurality of modes remotely, the handheld monitor 82 operationally interfacing with the base 28 through the use of the plurality of second buttons 88.

Video data 90 captured by the camera 74 is wirelessly communicated to the handheld monitor 82. When the motion sensor 86 detects motion in the crib 62, the video data 90 captured by the camera 74 is configured to be displayed in real time on the monitor screen 86. The monitor screen 86 is also configured to display the video data 90 captured by the camera 74 in real time independent of the motion sensor 76 detecting motion. Sounds received by the microphone 46 are also configured to be wirelessly communicated to the handheld monitor 82 and subsequently broadcast through the second speaker 92 in real time.

The plurality of second buttons 88 are configured to enable a user to interface with the base 28 remotely, the handheld monitor 82 in wireless operational communication with the base 28. Thusly, the present crib mobile and surveillance system 10 enables a caregiver to remotely monitor a child placed in a crib 62, to which crib 62 the device 10 is installed, in real time video by means of the handheld monitor 82 wirelessly communicating with the base 28. Moreover, the mobile member 24 may be activated remotely by activating the motion mode 24; audio tracks may be played through the speaker 20 when the audio mode 12 is activated remotely; and the plurality of LEDs 26 activated when the light mode 16 is activated remotely; by means of the plurality of second buttons 88 disposed on the handheld monitor 82.

What is claimed is:

1. A crib mobile and surveillance system comprising:
  a generally cubic base comprising:
    a front surface;
    a back surface;
    a first side surface;
    a second side surface;
    a top surface;
    a bottom surface;
    a plurality of buttons disposed upon the front surface;
    a speaker disposed within the front surface;
    a screen disposed within the front surface;
    a microphone disposed within the front surface;
    an MP3 player dock disposed in the first side surface;
    an attachment clip disposed on the back surface proximal to the top surface;
    a screw knob removably attachable to the back surface;
  a mobile member comprising:
    an arced pole disposed upwardly from the top surface, the arced pole having a distal end;
    a housing rotatably attached to the distal end, the housing comprising:
      a bottom face;
      a camera centrally disposed within the bottom face;
      a plurality of LEDs disposed around the camera;
      a motion sensor disposed within the bottom face;
      a plurality of support rods disposed laterally around the housing, the support rods disposed in a plane generally parallel with the bottom face;
      an attachable plurality of toys, each of the plurality of toys strung from each of the plurality of support rods;
  a handheld monitor in wireless operational communication with the base, the handheld monitor comprising:
    an antenna;
    a front side;
    a back side;
    a monitor screen disposed within the front side;
    a plurality of second buttons disposed upon the front side;
    a second speaker disposed within the back side;
  wherein the base is configured to play selectable audio tracks through the speaker, the audio tracks comprising:
    pre-recorded data, said data recorded through the microphone;
    a selection of preprogrammed data;
    extant tracks available on an extant MP3 player releasably positioned within the MP3 player dock;
    and the mobile member is configured to rotate the housing and the plurality of toys;
  the plurality of LEDs are configured to illuminate;
  the base relays video data captured by the camera, and sounds received by the microphone, to the handheld monitor in real time;
  the crib mobile and surveillance system configured to be selectively operable between a plurality of modes including an audio mode, a motion mode, and a light mode; wherein the audio mode activates the selectable audio tracks to be played through the speaker, the motion mode rotates the housing, and the light mode activates the plurality of LEDs;
  wherein each of the plurality of modes is configured to be operable independently and concurrently; and
  wherein each of the modes is selected, activated, and deactivated, by means of the plurality of buttons disposed on the base.

2. The crib mobile and surveillance system of claim 1 wherein the handheld monitor is configured to select, activate, and deactivate each of the plurality of modes remotely, the handheld monitor in wireless operational communication with the base.

3. The crib mobile and surveillance system of claim 2 wherein the motion sensor is configured to activate the monitor screen, and video data captured by the camera is relayed in real time thereto.

4. The crib mobile and surveillance system of claim 3 wherein the monitor screen is configured to display video captured by the camera in real time independent of the motion sensor.

5. The crib mobile and surveillance system of claim 4 wherein the pre-recorded data is recordable by means of the microphone and the plurality of buttons disposed on the base.

6. The crib mobile and surveillance system of claim of claim 5 wherein the pre-recorded data is storable and playable as up to three minutes of pre-recorded audio data.

7. The crib mobile and surveillance system of claim 6 wherein the MP3 player dock is configured to relay extant audio data from an extant MP3 player when the extant MP3 player is releasably placed within the dock, the extant audio data played through the speaker.

8. The crib mobile and surveillance system of claim 7 wherein the MP3 player dock is configured to releasably receive an extant MP3 player flush to the first side surface.

9. The crib mobile and surveillance system of claim 8 wherein sounds emitted proximal the base are received by the microphone and relayed wirelessly to the handheld monitor, there broadcast through the second speaker.

10. The crib mobile and surveillance system of claim 9 wherein the attachment clip is configured to attach to an extant crib, the screw knob attachable to the back surface and rotatable therein to releasably tighten the device securely to the crib.

* * * * *